US009311197B2

(12) United States Patent
Doeden et al.

(10) Patent No.: US 9,311,197 B2
(45) Date of Patent: Apr. 12, 2016

(54) ECOMMERCE DISTRIBUTION SYSTEM FAILOVER SYSTEM AND METHOD

(71) Applicant: Digital River, Inc., Minnetonka, MN (US)

(72) Inventors: Andrew Harris Doeden, Eden Prairie, MN (US); Samy V. Pugazhendhi, Ladera Ranch, CA (US)

(73) Assignee: DIGITAL RIVER, INC., Minnetonka, MN (US)

( * ) Notice: Subject to any disclaimer, the term of this patent is extended or adjusted under 35 U.S.C. 154(b) by 0 days.

(21) Appl. No.: 14/737,640

(22) Filed: Jun. 12, 2015

(65) Prior Publication Data

US 2015/0278045 A1 Oct. 1, 2015

Related U.S. Application Data

(63) Continuation of application No. 13/446,628, filed on Apr. 13, 2012, now Pat. No. 9,092,786.

(60) Provisional application No. 61/475,125, filed on Apr. 13, 2011.

(51) Int. Cl.
| | |
|---|---|
| *G06F 11/00* | (2006.01) |
| *G06F 11/20* | (2006.01) |
| *G06Q 30/00* | (2012.01) |
| *G06Q 30/06* | (2012.01) |
| *G06F 11/07* | (2006.01) |

(52) U.S. Cl.
CPC ........ *G06F 11/2007* (2013.01); *G06F 11/0709* (2013.01); *G06F 11/0769* (2013.01); *G06F 11/2023* (2013.01); *G06F 11/2041* (2013.01); *G06Q 30/018* (2013.01); *G06Q 30/06* (2013.01); *G06F 11/2048* (2013.01); *G06F 2201/85* (2013.01)

(58) Field of Classification Search
CPC . G06F 21/10; G06F 21/105; G06F 17/30206; G06F 21/34; G06F 21/121
See application file for complete search history.

(56) References Cited

U.S. PATENT DOCUMENTS

| | | | | |
|---|---|---|---|---|
| 5,677,918 | A * | 10/1997 | Tran | H04L 1/0083 370/321 |
| 6,292,905 | B1 * | 9/2001 | Wallach | G06F 9/4411 709/239 |
| 6,694,447 | B1 * | 2/2004 | Leach | G06F 11/2038 707/999.202 |
| 7,370,101 | B1 * | 5/2008 | Lakkapragada | G06F 11/2294 709/223 |

(Continued)

*Primary Examiner* — Bryce Bonzo
*Assistant Examiner* — Jeison C Arcos
(74) *Attorney, Agent, or Firm* — Billion & Armitage; Richard E. Billion; Lynn M. Holly (57) ABSTRACT

Disclosed is a computerized method, non-transitory machine-readable medium and computer system for ensuring that critical information, such as that allowing an ecommerce customer to activate purchased downloadable software, can be retrieved even if issues occur in the primary distribution center. The method receives a call for data (e.g. key) at a first endpoint associated with a first distribution center, determining that the call for the data cannot be fulfilled at the first endpoint, and shifting the call for the data to a second endpoint associated with a second distribution center. The computer system comprises a first and second distribution center system, including modules for: fulfilling a call for data, or key; determining if a call cannot be fulfilled, determining a plurality of error indications; and redirecting calls originally directed to one of a first computer or a second computer to the other of the first computer and the second computer.

19 Claims, 3 Drawing Sheets

(56) References Cited

U.S. PATENT DOCUMENTS

| | | | | |
|---|---|---|---|---|
| 2002/0002468 | A1* | 1/2002 | Spagna | G06F 21/10 713/193 |
| 2002/0146132 | A1* | 10/2002 | Medvinsky | H04L 9/0822 380/279 |
| 2003/0105718 | A1* | 6/2003 | Hurtado | G06F 21/10 705/51 |
| 2004/0039705 | A1* | 2/2004 | Svancarek | G06F 21/10 705/51 |
| 2004/0107368 | A1* | 6/2004 | Colvin | G06F 21/121 726/30 |
| 2004/0117628 | A1* | 6/2004 | Colvin | G06F 21/121 713/176 |
| 2004/0117644 | A1* | 6/2004 | Colvin | G06F 21/121 713/193 |
| 2004/0199768 | A1* | 10/2004 | Nail | H04L 63/0823 713/169 |
| 2005/0149759 | A1* | 7/2005 | Vishwanath | G06F 21/34 726/4 |
| 2005/0289540 | A1* | 12/2005 | Nguyen | G06F 9/45558 718/1 |
| 2006/0195560 | A1* | 8/2006 | Newport | H04L 41/0893 709/223 |
| 2006/0224470 | A1* | 10/2006 | Garcia Ruano | G06Q 20/04 705/26.1 |
| 2007/0107048 | A1* | 5/2007 | Halls | G06F 21/33 726/4 |
| 2008/0052556 | A1* | 2/2008 | Donovan | G06F 11/2028 714/4.11 |
| 2008/0095143 | A1* | 4/2008 | Lai | H04L 41/06 370/352 |
| 2008/0199003 | A1* | 8/2008 | Hennessey | G06F 17/30206 380/30 |
| 2009/0249440 | A1* | 10/2009 | Platt | H04L 63/0815 726/1 |
| 2010/0131386 | A1* | 5/2010 | Shiely | G06Q 30/0185 705/26.1 |

* cited by examiner

ECOMMERCE DISTRIBUTION SYSTEM FAILOVER SYSTEM AND METHOD

This application is a continuation of U.S. application Ser. No. 13/446,628 filed on Apr. 13, 2012, which claims priority under 35 U.S.C. §119(e) to U.S. Provisional Patent Application Ser. No. 61/475,125 filed on Apr. 13, 2011, the entire contents of which are hereby incorporated by reference. A claim of priority is made.

BACKGROUND

E-commerce has had a profound impact on the way people shop around the world. When done right, e-commerce offers shoppers an efficient and reliable way to meet their shopping needs met. Nearly anything consumers would want can be purchased online. Where online purchases and electronic products are concerned, customer expectations are that the transaction will be completed quickly and accurately. Particularly, with electronic products the expectation is that the product purchased and downloaded will be available for use immediately after the purchase. Delivering this kind of service requires that systems are up and running, or at least appear to be up and running 100% of the time. With certain transactions, it is absolutely crucial that this is the case in order to maintain customer satisfaction. For example, payment systems must be accessible in order to complete a purchase so the user does not have to return at a later time to complete the purchase. Digital rights management for electronic products must be available so that the customer may enjoy full use of the product as soon as it has been purchased and downloaded.

In order to provide a positive customer experience, e-commerce providers and distributors require a failover system and method that ensures that technical errors and problems do not interfere with timely provision of critical electronic data.

SUMMARY

The present disclosure relates to e-commerce system providing products and services over the internet. In general, the principles of the inventive features relate to the provision of time-critical data that must be provided to an e-commerce customer upon purchase of certain items. A distribution center electronically providing time-critical data must have a computer system with flawless or near-flawless service availability. One embodiment of such a distribution center computer system comprises a module for checking the status of the distribution center computer system; a module for generating error codes associated with errors found in the distribution center computer system, the error codes categorized as a resubmittable error code or a non-resubmittable error code; a timer which is set in response to the generation of a resubmittable error code; a module for receiving a request for a key; and a module for generating a response to a received request for a key, the response being a failover status indicator indicating that the request for the key cannot be fulfilled because either (1) a timer is active for a resubmittable error or (2) a non-resubmittable error has been identified by an error code; or a key when neither (1) a timer is active or (2) a non-resubmittable error has been generated by the module for generating error codes.

Another embodiment of such a distribution center computer system comprises a module for checking the status of the distribution center computer system; a module for generating error codes associated with errors found in the distribution center computer system, the error codes categorized as a resubmittable error code or a non-resubmittable error code; a module for receiving a request for a key; and a module for generating a response to a received request for a key, the response being a failover status indicator indicating that the request for the key cannot be fulfilled because either (1) a resubmittable error is present upon a subsequent request for the key, or (2) a non-resubmittable error has been identified by an error code; or a key when neither (1) a resubmittable error is present or (2) a non-resubmittable error is present.

Still another embodiment may comprise a module for receiving a call for a key at a first endpoint associated with a first distribution center; a module for determining that the call for a key cannot be fulfilled at the first endpoint; a module for identifying an alternative, secondary endpoint for the first distribution system at a second distribution center system; sa module for producing an error code in response to determining the reason that the call for the key cannot be fulfilled; a module for sorting the error codes into a first resubmittable group of error codes and a second non-resubmittable group of error codes; and a module for redirecting the calls to the second endpoint in response to an error code being associated with the second non-resubmittable group of error codes.

The details of these embodiments are set forth in the accompanying drawings and the description below. Other features and advantages of the invention will be apparent from the description, the drawings, and the claims.

DETAILED DESCRIPTION

Overview

Figure 1:
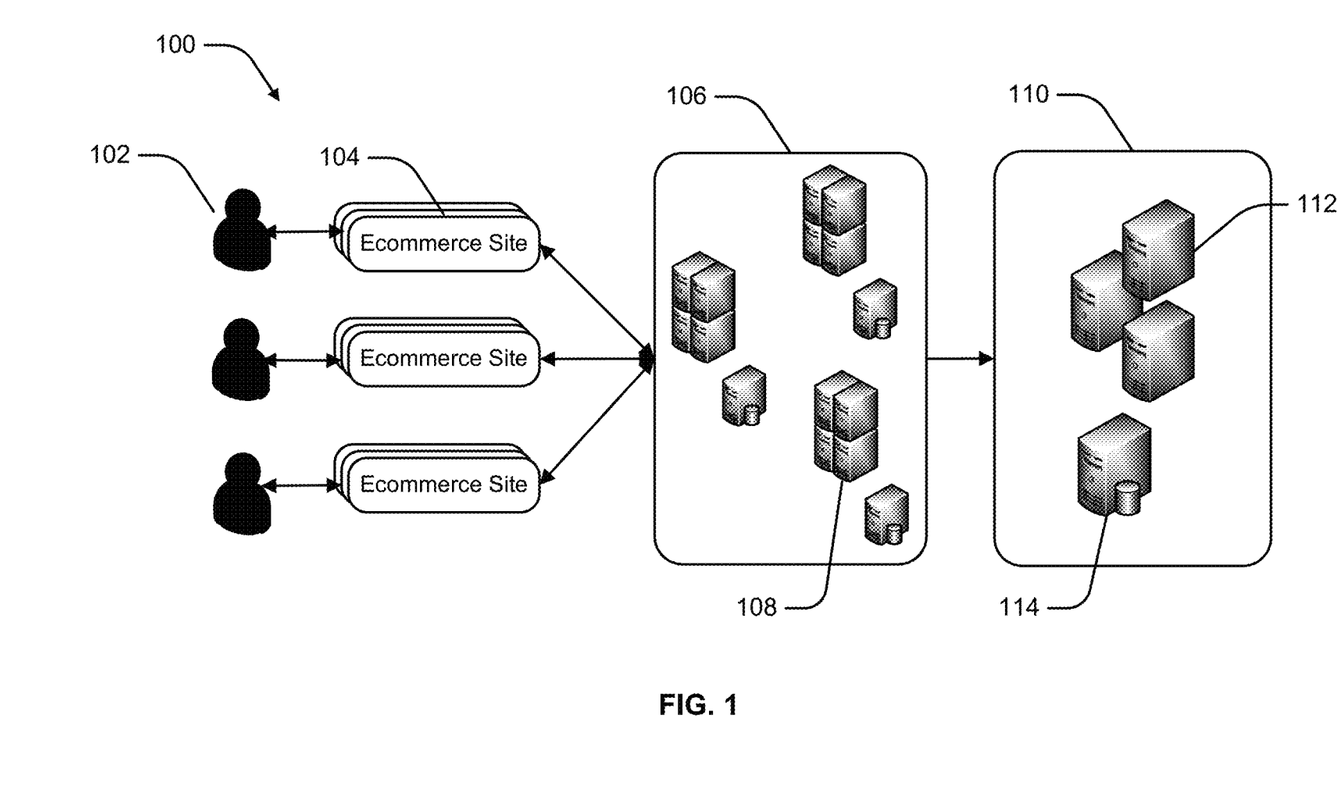
FIG. 1 illustrates an exemplary context for a failover/failback system and method

FIG. 1 illustrates an exemplary downloadable software distribution system for which an exemplary failover method may be used. In such a system, the customers 102 access web stores on e-commerce sites 104 in order to purchase downloadable software. Each web store operator 104 offering a software manufacturer's software product for purchase and download may be designated as a distributor 106. A single distributor 106 may host multiple customer-facing e-commerce sites 104. Each web site may be integrated with a plurality order taker pods 108 that receive orders from the various sites based on technical or other requirements. Each pod contains application servers and a replication of the operational data store (ODS) that captures and records orders taken within the pod and which are later synced with a primary ODS.

The distributor 106 provides the ecommerce transactional capabilities to complete the purchase process, but must also provide a Proof of Eligibility (POE) to allow the customer to use the product. Proofs of Eligibility include product keys and other types of eligibility verifiers. POE (also referred to generically as key) may be held in inventory by the software manufacturer or by the distributor 106. The software manufacturer 110 may want to retain control over the POE inventory for many reasons, including the ability to properly recognize revenue at the time of key delivery. This also offers a benefit to the distributor 106 in that it does not have to purchase keys in advance and hold them in inventory. To facilitate distribution of keys to the customer at the time the order is placed, the distributor 106 may be integrated with the software manufacturer's key distribution system 112. In addition, the key distribution system 112 may be integrated with the software manufacturer's database or enterprise resource planning system 114, recording the data sent in purchase order and return messages from the distributor to the software manufacturer directly into accounting and tracking systems.

Referring again to FIG. 1, an e-commerce provider 106 generally integrates its web sites with a number of pods 108 in a data center. A pod 108 may consist of a plurality of computing devices, including servers and data stores that facilitate e-commerce transactions. Generally, a data center has several pods 108. The internal composition as well as the configuration of pods 108 in a data center and network interaction to and from the pods 108 is typically designed in a way that provides technological efficiency and reliability for the e-commerce provider/distributor 106.

A computer, computing or electronic device or server typically includes a memory, a secondary storage device, a processor (central processing unit, or CPU), an input device, a display device, and an output device. The memory may include random access memory (RAM) or similar types of memory. Software applications, stored in the memory or secondary storage for execution by a processor are operatively configured to perform the operations in one embodiment of the system. The software applications may correspond with a single module or any number of modules. Modules of a computer system may be made from hardware, software, or a combination of the two. Generally, software modules are program code or instructions for controlling a computer processor to perform a particular method to implement the features or operations of the system. The modules may also be implemented using program products or a combination of software and specialized hardware components. In addition, the modules may be executed on multiple processors for processing a large number of transactions, if necessary or desired.

A secondary storage device may include a hard disk drive, floppy disk drive, CD-ROM drive, DVD-ROM drive, or other types of non-volatile data storage, and may correspond with the various equipment and modules shown in the figures. The processor may execute the software applications or programs either stored in memory or secondary storage or received from the Internet or other network. The input device may include any device for entering information into computer, such as a keyboard, joy-stick, cursor-control device, or touch-screen. The display device may include any type of device for presenting visual information such as, for example, a computer monitor or flat-screen display. The output device may include any type of device for presenting a hard copy of information, such as a printer, and other types of output devices include speakers or any device for providing information in audio form.

Although the computer, computing device or server has been described with various components, it should be noted that such a computer, computing device or server can contain additional or different components and configurations. In addition, although aspects of an implementation consistent with the system disclosed are described as being stored in memory, these aspects can also be stored on or read from other types of computer program products or computer-readable media, such as secondary storage devices, including hard disks, floppy disks, or CD-ROM; a non-transitory carrier wave from the Internet or other network; or other forms of RAM or ROM. Furthermore, it should be recognized that computational resources can be distributed, and computing devices can be client or server computers. Client computers and devices (e.g.) are those used by end users to access information from a server over a network, such as the Internet. These devices can be a desktop or laptop computer, a standalone desktop, or any other type of computing device. Servers are understood to be those computing devices that provide services to other machines, and can be (but are not required to be) dedicated to hosting applications or content to be accessed by any number of client computers. Web servers, application servers and data storage servers may be hosted on the same or different machines. They may be located together or be distributed across locations. Operations may be performed from a single computing device or distributed across geographically or logically diverse locations.

Client computers access features of the system described herein using Web Services. Web services are self-contained, modular business applications that have open, Internet-oriented, standards-based interfaces. According to W3C, the World Wide Web Consortium, a web service is a software system "designed to support interoperable machine-to-machine interaction over a network. It has an interface described in a machine-processable format (specifically web service definition language or WSDL). Other systems interact with the web service in a manner prescribed by its description using Simple Object Access Protocol (SOAP) messages, typically conveyed using hypertext transfer protocol (HTTP) or hypertext transfer protocol secure (HTTPS) with an Extensible Markup Language (XML) serialization in conjunction with other web-related standards." Web services are similar to components that can be integrated into more complex distributed applications.

While the failover/failback method disclosed herein is described in the context of an embodiment of software key fulfillment, it will be recognized that it can be used in other applications as well. Further, while specific modules are described, other modules can be added or deleted without departing from the scope and spirit of the present invention. All examples are offered by way of example and not limitation. It should also be understood that the terms "POE" and key are synonymous and are used interchangeably throughout this disclosure.

Fulfillment Service Overview

Access to a software manufacturer's 110 key fulfillment service 112 may be restricted to the interfaces that the manufacturer chooses to expose. Key distribution services provided by the fulfillment service may be exposed via web services accessible through basic https. Authentication via a valid domain user account is generally required in order to access the services. In one embodiment, a software distributor 106 fulfillment service allows distributors 106 to contact the software manufacturer 110 during an end-customer 102 sale, provide the product information and other purchase order data, retrieve product keys, and complete the end-customer 102 transaction. The system can also allow reporting of order and return activity.

E-commerce web servers 108 and their ancillary services such as key fulfillment web services 112 can be distributed worldwide to allow manufacturers, distributors, and their partners to do business from various locations. For example, Table 1 describes exemplary site location/service area configurations. Locations are offered by way of example and not limitation. Manufacturer site 110, service areas and distributor 106 sites can be any site or area determined by the manufacturer and/or distributor.

TABLE 1

Site Locations and Service Areas

| Fulfillment Region | Site Location | Service Area |
|---|---|---|
| 1 | UK | Europe, Middle East, and Africa (EMEA) |
| 2 | Tokyo | Asia Pacific (APAC) |
| 3 | Puerto Rico | North America |

Initially, contact from the distributor 106 to the manufacturer 110 can be made via a purchase order or other web service method. In one embodiment, each distributor 106 account accesses the primary manufacturer site that is appropriate to the distributor site location 104. The remaining web methods reference the initial method, since they are continuations of that original transaction. The purchase order record can be stored in only one regional database, that is, the one that was originally contacted. Therefore, the distributor 106 must track where the original purchase order was sent, and use that same region for any related method transactions. A fulfillment region code, as shown in Table 1, can be returned via the purchase order response to assist with the continuity of transactions.

Such an exemplary system must have significant reliability in order to ensure that consumers are able to obtain their product keys as quickly and reliably as possible. Therefore, failover and failback protocols are crucial to software key fulfillment system provisioning.

Failover and Failback

Failover and failback processing was created in order to ensure customers performing transactions that required real or near real time responses, such as buying products that required activation or product keys, received the response even if errors occurred in the primary distribution center. The computing devices 108 and 112 belonging to the distributor and the manufacturer, respectively, operate to provide the keys to the customer. These computing devices contain modules stored in memory that, when executed by the processor in the computing device, allow the distribution system to receive a call for a key at a first endpoint associated with a first distribution center, determine that the key cannot be fulfilled at the endpoint, and shift (i.e. failover) the call to second endpoint associated with a second distribution center.

Failover, defined as the ability to systematically change distribution center in the event of failure, can be configured for each site by setting the primary, secondary and tertiary distribution sites (see Table 2, below) in which the system's business logic uses. In the initial communication, if the primary manufacturer site is unavailable or returns specific error codes, then the secondary site is called. If the secondary site is unavailable or returns specific error codes, then the tertiary site is called. Details are provided in Table 2.

TABLE 2

Distributor Region and Sites

| | Distribution Site | | |
|---|---|---|---|
| Distributor Region | Primary | Secondary | Tertiary |
| North America | Puerto Rico | UK | Tokyo |
| Europe, Middle East and Africa (EMEA) | UK | Tokyo | Puerto Rico |
| Asia Pacific (APAC) | Tokyo | UK | Puerto Rico |

Business logic is written to handle specific error codes or error scenarios that tell the system whether or not to failover or to make a subsequent attempt to reach the original endpoint. A "resubmittable" code, or system error, sends the communication back to the original endpoint for a second time. If failure occurs in the second call to the original endpoint (assuming it is consecutive to the first call), that endpoint is not used again until the issue has been corrected; a "non-resubmittable" code indicates a catastrophic issue at the endpoint so that endpoint is not used again until the issue has been corrected. With certain error codes, business logic is written to not failover as failure is imminent from all sites.

Failover/failback logic is distributed to each web server in order to have each web server act independently of each other. Each web server can failover to the next available endpoint after a system error or error code is received. For instance, with timeouts (defined as no response within a given configurable timeframe), the failover happens after 2 subsequent timeouts.

In a failover event, each web server maintains a timer since the failover, and fails back to the original endpoint after a configurable time period. In one embodiment, the reset interval may be set to 30 minutes. Once the reset interval is met, the system will attempt to call the original endpoint with the next call. If that call succeeds, the web server fails back to the original endpoint. If the call fails, system resets the web server's reset interval to start over.

Figure 2:
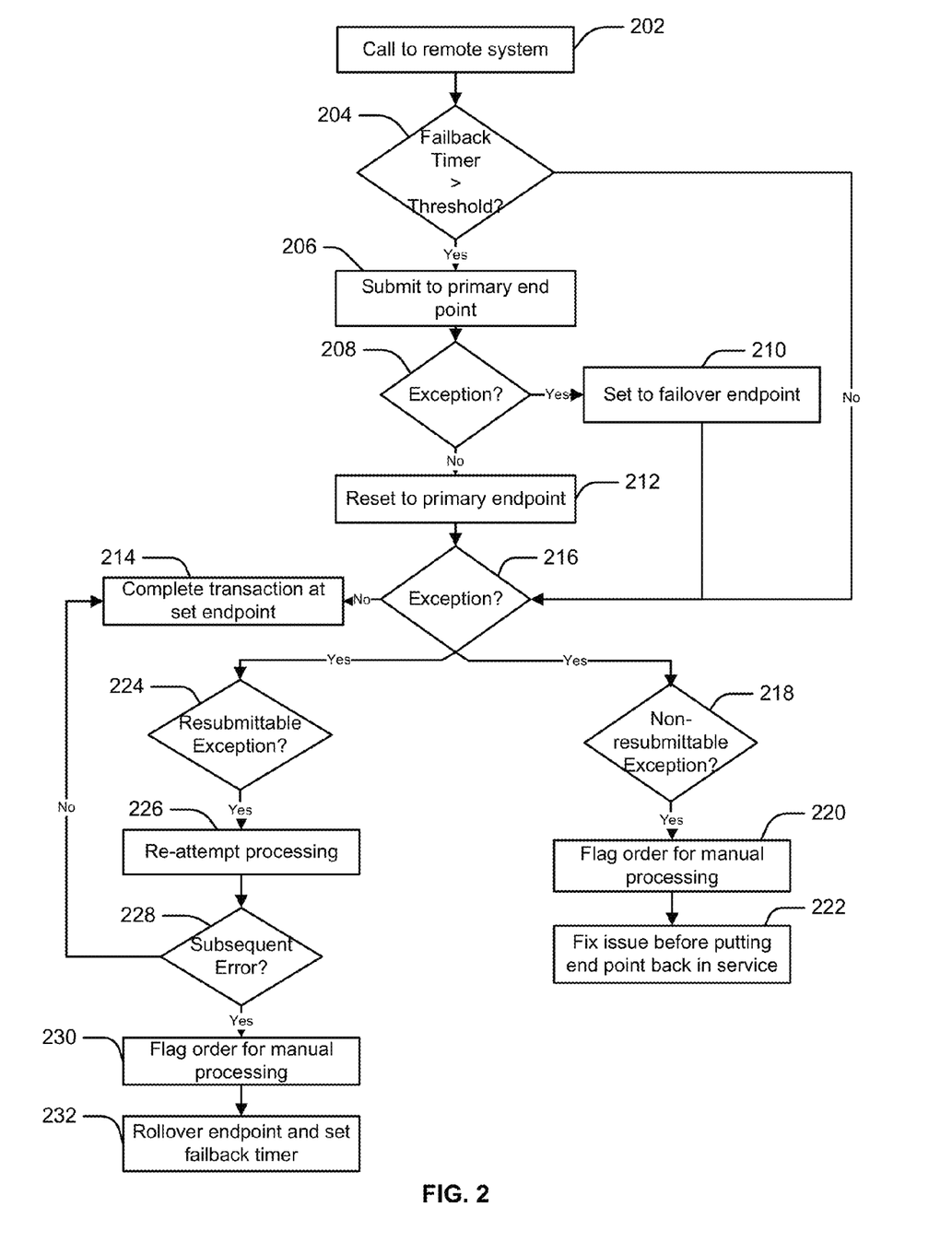
FIG. 2 is a flow diagram of an exemplary failover/failback system processing exceptions

FIG. 2 illustrates the process of failover/failback for exceptions received from downstream system processes. The e-commerce system makes a call to the remote system 202. The failback timer is checked to see if it is over the threshold 204. If the timer is over the threshold, the transaction is directed to the primary endpoint 206. If there is no exception at this point, the endpoint is reset to the primary 212. If an exception occurs here, the endpoint is set to a failover endpoint 210. If there are no subsequent exceptions, the transaction is completed at the set endpoint 214. If the timer is below the threshold, indicating continuing issues with the primary endpoint, the transaction continues on the set endpoint 214. If there is no further exception 216 against the primary endpoint the transaction is completed there 214. If an exception occurs 216, error codes provide an indication of the type of error encountered, including whether the exception is resubmittable 224 or not 218. If a non-resubmittable exception occurs 218, the message is flagged for subsequent processing 220 and the issue with the distribution center must be fixed before putting the endpoint back into service 222. If the exception is resubmittable 224, a configurable number of subsequent attempts are made to reprocess at the set endpoint 226. A subsequent error 228 requires the message to be flagged for subsequent processing 230 and a rollover of the endpoint 232, (e.g. reshifting from or bypass of) the primary endpoint, to the next available distribution endpoint available for the region. If not, the transaction completes at the set endpoint 214.

For example, a customer ordering from a site in the North America region places an order for downloadable software. A message (such as a purchase order request) is sent to the manufacturer from the Puerto Rico distributor site. The failover timer is checked to see if the Puerto Rico endpoint has been bypassed to a failover site, indicating that there is a problem with the primary. If the timer is greater than the threshold value (say, 30 minutes), the inbound message will be sent to the primary endpoint with the assumption that the issue has been fixed. If there is a further issue with the primary (the inbound message contains an error), the primary is bypassed to the secondary endpoint, in this case, the United Kingdom distribution site. Each error is associated with an error code indicating that a particular type of error has occurred. If the error code is of a resubmittable type, the system attempts to reprocess the message. If there are no subsequent errors, the order continues to process at the distributor's Puerto Rico site. If an additional error occurs on the subsequent attempt, the order is flagged for subsequent processing. If the error code indicates a non-resubmittable error, the endpoint is rolled over to the next available server and the failback timer is set. The North American secondary site (United Kingdom, as specified in Table 2 above) is first checked for availability. If it is available, the transaction is completed there. If not, the system checks the North American tertiary site (Tokyo). The distributor sites are checked in a round-robin fashion until an accessible site is found.

Figure 3:
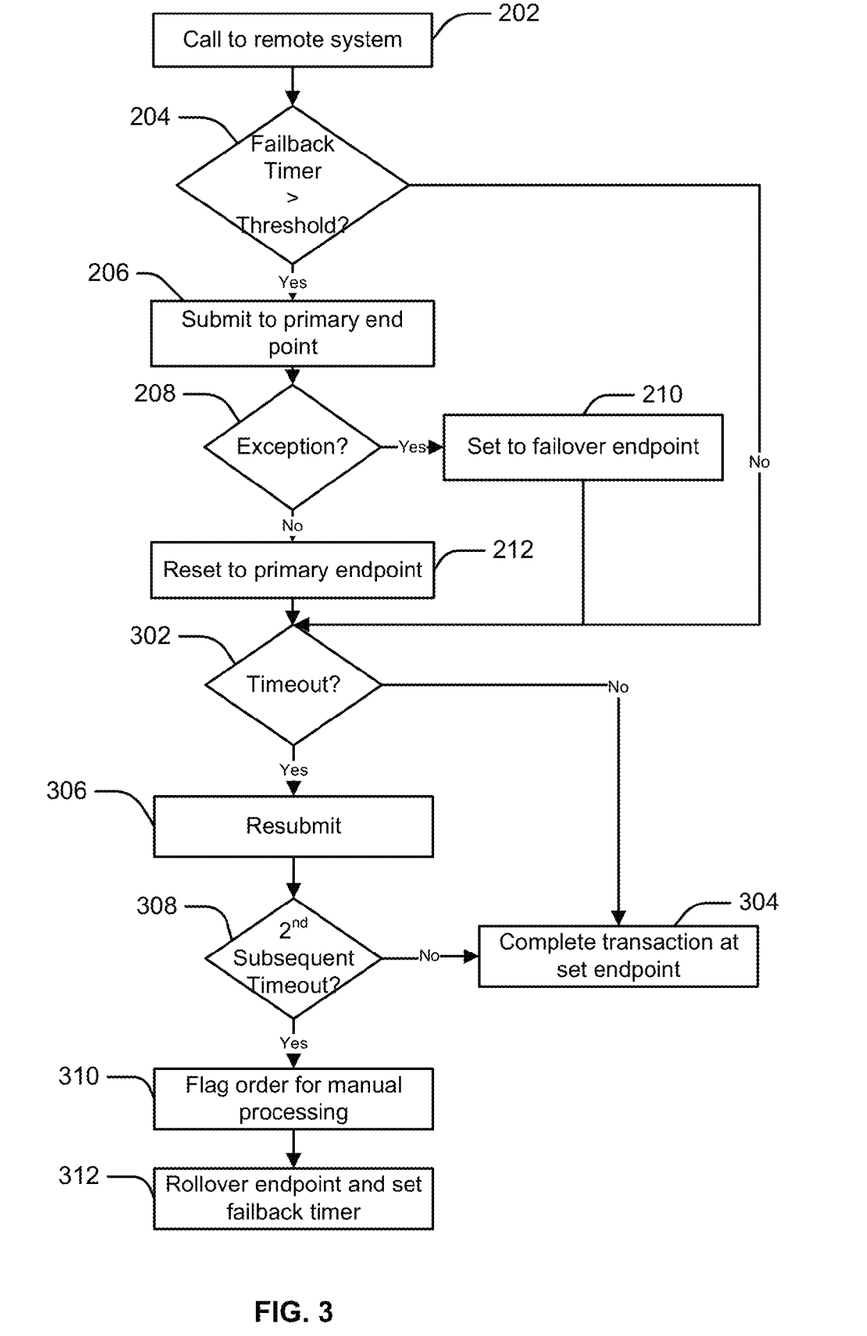
FIG. 3 is a flow diagram of an exemplary failover/failback system processing time outs

Time outs can also be an issue. The process for handling time outs is similar to the process for handling exceptions, and is illustrated in FIG. 3. Again, a call is made to the remote system 202. The failback timer is checked to see if it is over the threshold 204. If the timer is over the threshold, the transaction is directed to the primary endpoint 206. If there is no exception at this point, the endpoint is reset to the primary 212. If an exception occurs here, the endpoint is set to a failover endpoint 210. If no time out subsequently occurs 302, the transaction is completed normally 304 at the set endpoint. If a time out occurs 304, a second attempt is made 306 and if a second timeout occurs 308 the order is flagged for subsequent processing 310 and the endpoint is rolled over 312 as per the distributor site and region configuration, examples of which are found in Table 2 and described in the example above.

The foregoing detailed description discloses a computerized method and non-transitory machine-readable medium for ensuring that critical information, such as the retrieval of a software key that will allow an ecommerce customer to activate purchased downloadable software, can be retrieved from an external system even if errors or technical issues occur in the primary distribution center. The method involves receiving a call for data (such as a key) at a first endpoint associated with a first distribution center, determining that the call for the data, cannot be fulfilled at the first endpoint, and shifting the call for the data to a second endpoint associated with a second distribution center.

The detailed description also discloses a computer system for fulfilling calls for data, such as activation keys, comprising at least a first and second distribution center system, each of which include a module for fulfilling a call for the data, or key, a module for determining if a call cannot be fulfilled, which determines also may determine a plurality of error indications, and a module for redirecting calls originally directed to one of a first computer or a second computer to the other of the first computer and the second computer.

While the failover/failback system disclosed above is described in terms of a software key fulfillment system and method, it may be used for other systems as well. For example, any real-time or near real-time e-commerce process that must ensure that important data or information be delivered to the customer in a time critical manner. Such applications include, among many others, payment processing, file downloads, digital rights management, tax processes and ticket sales, for example.

A computerized method includes receiving a call for a key at a first endpoint associated with a first distribution center, determining that the call for a key cannot be fulfilled at the first endpoint, and shifting the call for the key to a second endpoint associated with a second distribution center. The computerized method can also include producing an error code in response to determining that the call for the key cannot be fulfilled. In the computerized method, the error codes are sorted into a first group of error codes and a second group of error codes. The computerized method also includes resending the call to the first endpoint where the key was sent when the error code is in one of the first group or the second group of error codes. In another embodiment, shifting the call for the key to a second endpoint associated with a second distribution center is done in response to receiving an error code after resending the call to the first endpoint the call for the key when the error code is in one of the first group or the second group of error codes. In still another embodiment, the call is resent to the first when the error code is in one of the first group or the second group of error codes, and reshifting the call to the second endpoint is done in response to an error code in the second group of error codes. In another embodiment, at least one other call intended for the first endpoint is directed to bypass the first endpoint. The at least one other call directed to for the second endpoint for an amount of time. The bypass associated with the first endpoint is removed after the amount of time expires.

A computer system for fulfilling calls for keys includes a first distribution center system, and a second distribution center system. Each of the first distribution center system and the second distribution center system include a module for fulfilling a call for a key, a module for determining if a call cannot be fulfilled, and a module for redirecting calls originally directed to one of a first computer or a second computer to the other of the first computer and the second computer. The module for determining also produces a plurality of error indications. In some embodiments, the computer system also includes a timer module. The module redirecting calls acts in response to a time period enabled by the timer module. The module for redirecting calls is disabled after the time period is disabled in the timer module. The computer system can also include a module for sorting the plurality of error codes into a first retry group and a second bypass group. The module for redirecting the calls to another distribution center is disabled to allow at least one retry of the call when the error code is associated with the first retry group. The module for redirecting the calls to another distribution center is enabled in response to the error code being associated with the second bypass group. The modules discussed above can be formed from a combination of instruction sets and hardware, hardware only, or software only. When the computerized method is programmed into a memory of a general purpose computer, the resulting computer can form a special purpose machine. An instruction set programmed into memory is also in the form of a non-transitory set of instructions.

A non-transitory machine-readable medium provides instructions that, when executed by a machine, causes the machine to perform operations including receiving a call for a key at a first endpoint associated with a first distribution center, determining that the call for a key cannot be fulfilled at the first endpoint, and shifting the call for the key to a second endpoint associated with a second distribution center. The machine-readable medium can further cause the machine to perform operations that include producing an error code in response to determining that the call for the key cannot be fulfilled, and sorting the error codes into a first retry group of error codes and a second bypass group of error codes. The instructions, when executed by a machine, can also cause the calls to be shifted to the second endpoint in response to an error code being associated with the second bypass group. In some embodiments, the shift to the second endpoint for an amount of time is in response to an error code being associated with the second bypass group. In another embodiment, the instructions, when executed by a machine, can cause the calls to be resent to the first endpoint in response to an error code being associated with the first retry group.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application such as such that the distributor may select different site locations, numbers and locations of fulfillment regions, and numbers of user sites while maintaining substantially the same functionality without departing from the scope and spirit of the present invention.

What is claimed is:

1. A distribution center computer system comprising:
   a module for checking the status of the distribution center computer system;
   a module for generating error codes associated with errors found in the distribution center computer system, the error codes categorized as a resubmittable error code or a non-resubmittable error code;
   a timer which is set in response to the generation of a resubmittable error code;
   a module for receiving a request for a key; and
   a module for generating a response to a received request for a key, the response being:
   I. a failover status indicator indicating that the request for the key cannot be fulfilled because either (1) a timer is active for a resubmittable error or (2) a non-resubmittable error has been identified by an error code, wherein the non-resubmittable error codes include errors that the failover status indicator indicates that the request for the key should not be redirected to another distribution center computer system; or
   II. the key when neither (1) a timer is active or (2) a non-resubmittable error has been generated by the module for generating error codes.

2. The distribution center computer system of claim 1 wherein the failover status indicator redirects a request for the key to another distribution center computer system.

3. The distribution center computer system of claim 1 wherein the failover status indicator redirects a request for the key to another distribution center computer system, the distribution center computer system further including a table of at least one other distribution center computer system.

4. The distribution center computer system of claim 1 wherein the failover status indicator indicates that the request for the key should be redirected to another distribution center computer system.

5. The distribution center computer system of claim 1 wherein the failover status indicator indicates that the request for the key should be redirected to another distribution center.

6. The distribution center computer system of claim 1 wherein the timer is set for a default time period in response to an error that results in a resubmittable error code.

7. The distribution center computer system of claim 1 wherein the timer is set for a first time period in response to a first resubmittable error code, and set for a second time period in response to a second resubmittable error code.

8. A distribution center computer system comprising:
   a module for checking the status of the distribution center computer system;
   a module for generating error codes associated with errors found in the distribution center computer system, the error codes categorized as a resubmittable error code or a non-resubmittable error code;
   a module for receiving a request for a key;
   a module for generating a response to a received request for a key, the response being:
   I. a failover status indicator indicating that the request for the key cannot be fulfilled because either (1) a timer is active for a resubmittable error or (2) a non-resubmittable error has been identified by an error code, wherein the non-resubmittable error codes include errors that the failover status indicator indicates that the request for the key should not be redirected to another distribution center computer system; or
   II. the key when neither (1) a timer is active or (2) a non-resubmittable error has been generated by the module for generating error codes.

9. The distribution center computer system of claim 8 wherein the subsequent request for the key is a repeat request for the key.

10. The distribution center computer system of claim 8 further comprising a module for flagging an order for manual processing when a non-resubmittable error is present on the distribution center computer system.

11. The distribution center computer system of claim 8 further comprising a module for flagging an order for manual processing when a resubmittable error is present on the distribution center computer system and a key request has been submitted for a re attempt at processing.

12. The distribution center computer system of claim 8 further comprising a module for flagging an order for manual processing when a non-resubmittable error is generated for the distribution center computer after a selected time period.

13. The distribution center computer system of claim 8 further comprising:
   a timer which is set in response to generation of a resubmittable error, the distribution center computer system receiving requests for keys after the timer times out; and
   a module for flagging an order for manual processing in response to an identical resubmittable error being generated for the distribution center computer after the timer times out for the identical resubmittable error.

14. The distribution center computer system of claim 13 wherein the identical resubmittable error is generated within a selected time of the time out.

15. A computer system comprising:
   a module for receiving a call for a key at a first endpoint associated with a first distribution center;
   a module for determining that the call for the key cannot be fulfilled at the first endpoint;
   a module for identifying an alternative, secondary endpoint for the first distribution system at a second distribution center system;
   a module for producing an error code in response to determining the reason that the call for the key cannot be fulfilled;
   a module for sorting the error codes into a first resubmittable group of error codes and a second non-resubmittable group of error codes, wherein the non-resubmittable error codes include errors that the failover status indicator indicates that the request for the key should not be redirected to another distribution center computer system; and a module for redirecting the calls to the second endpoint in response to an error code being associated with the second non-resubmittable group of error codes.

16. The computer system of claim 15 further comprising a module for shifting calls for the key to the second endpoint for an amount of time in response to an error code being associated with the second bypass group.

17. The computer system of claim 16 further comprising a timer for determining the amount of time.

18. The computer system of claim 15 further comprising a module for shifting calls for the key to the second endpoint for an amount of time in response to an error code being associated with the second bypass group, wherein at least one different amount of time is associated with at least one error code in the second bypass group.

19. The computer system of claim 16 further comprising a module for resending the calls to the first endpoint in response to an error code being associated with the first resubmittable group of error codes.

* * * * *